United States Patent [19]
Selby

[11] Patent Number: 5,871,068
[45] Date of Patent: Feb. 16, 1999

[54] DEVICE FOR PRECISE REPLACEMENT OF LIQUIDS, BEFORE, DURING, OR AFTER OPERATION OF A MECHANISM WITH METHOD OF USE THEREOF

[76] Inventor: Theodore W. Selby, 4402 Arbor Dr., Midland, Mich. 48640

[21] Appl. No.: 934,796

[22] Filed: Sep. 22, 1997

Related U.S. Application Data

[63] Continuation of Ser. No. 541,735, Oct. 10, 1995, abandoned, which is a continuation-in-part of Ser. No. 324,593, Oct. 18, 1994, abandoned.

[51] Int. Cl.[6] .............................. F16C 3/14; F16N 33/00
[52] U.S. Cl. ..................... 184/1.5; 184/6.4; 184/7.4; 184/39; 184/105.1; 184/108; 123/196 R; 123/196 S; 222/386.5; 222/389
[58] Field of Search .............................. 184/1.5, 6.4, 7.4, 184/39, 105.1, 108; 123/1 A, 196 R, 196 S; 222/386.5, 389; 137/564.5; 92/90–92, 98 R, 49

[56] References Cited

U.S. PATENT DOCUMENTS

| | | | |
|---|---|---|---|
| 637,250 | 11/1899 | Hall | 137/564.5 |
| 1,493,049 | 5/1924 | Mitchell | 184/39 |
| 1,630,899 | 5/1927 | Lynch . | |
| 3,033,311 | 5/1962 | Edgar et al. | 184/1.5 |
| 3,112,845 | 12/1963 | Bryant . | |
| 3,223,291 | 12/1965 | Thomas . | |
| 3,236,268 | 2/1966 | Simpson | 184/1.5 |
| 3,370,759 | 2/1968 | Johansson . | |
| 3,513,941 | 5/1970 | Becnel . | |
| 3,565,287 | 2/1971 | Johnston . | |
| 4,120,425 | 10/1978 | Bethurum | 222/386.5 |
| 4,193,487 | 3/1980 | Takeuchi | 184/1.5 |
| 4,438,872 | 3/1984 | Dooley et al. . | |
| 4,745,989 | 5/1988 | DiMatteo . | |
| 4,869,346 | 9/1989 | Nelson | 184/1.5 |
| 5,044,334 | 9/1991 | Bedi | 184/1.5 |
| 5,190,120 | 3/1993 | Watts | 184/1.5 |
| 5,238,085 | 8/1993 | Engelmann . | |
| 5,263,445 | 11/1993 | Bedi et al. . | |
| 5,284,223 | 2/1994 | Fisher | 184/65 |
| 5,318,080 | 6/1994 | Viken | 184/1.5 |
| 5,361,870 | 11/1994 | Courcy | 184/1.5 |
| 5,372,219 | 12/1994 | Peralta . | |
| 5,398,851 | 3/1995 | Sancoff et al. | 222/386.5 |
| 5,522,474 | 6/1996 | Burman | 184/1.5 |

FOREIGN PATENT DOCUMENTS

| | | | |
|---|---|---|---|
| 1023597 | 1/1958 | Germany | 137/564.5 |

*Primary Examiner*—Christopher Verdier
*Attorney, Agent, or Firm*—Christopher John Rudy

[57] ABSTRACT

A device for the precise replacement of liquids before, during, or after operation of a mechanism such as, for example, an automobile motor or automatic transmission, includes a housing and a piston or diaphragm for separation of the housing into inlet and exit portions. A plurality of bags can be employed in the housing for inlet and exit portions and as a diaphragm. Pressure from the volume of liquid in a closed vessel that is to be replaced is used to measure the amount of liquid replacing the liquid that is in the closed vessel. The device can be employed during normal operation of the mechanism, and a method for the precise replacement of liquids employs the device during normal operation of the mechanism.

25 Claims, 2 Drawing Sheets

DEVICE FOR PRECISE REPLACEMENT OF LIQUIDS, BEFORE, DURING, OR AFTER OPERATION OF A MECHANISM WITH METHOD OF USE THEREOF

CROSS REFERENCE

This is a continuation of application Ser. No. 08/541,735 filed Oct. 10, 1995 and now abandoned, which is a continuation-in-part of application Ser. No. 08/324,593 filed Oct. 18, 1994 and now abandoned. The specification of the '593 application is incorporated herein by reference.

FIELD OF THE INVENTION

This invention concerns a device for the precise replacement of liquids before, during, or after operation of a mechanism, such as, for example, an automobile motor.

BACKGROUND TO THE INVENTION

The inventor hereof, using years of experience, has observed a need for such a device and has sought fulfillment of that need.

The following art is now known. However, the citation of such art is not to be construed as an indication that the same is necessarily relevant to the present invention and its claims.

Courcy, U.S. Pat. No. 5,361,870, discloses a transmission fluid exchange apparatus. Its tank structure is arranged to include a piston to divide the tank into a first and second chamber, wherein the first chamber is arranged to receive used transmission fluid and simultaneously direct fresh transmission fluid into an associated transmission pressure line. Generally, its piston is attached to a piston rod which is directed through and in a sealed sliding relationship with the second end wall.

Viken U.S. Pat. No. 5,318,080, discloses a transmission fluid changer. Its fluid changing, in an automatic transmission, is by opening the cooler line and draining used fluid, at the flow of normal circulation, out the cooler line from the transmission into a drain receptacle for receiving used fluid and simultaneously supplying fresh fluid, from a pressurized supply receptacle, into the cooler return line to the transmission at a similar controlled rate that is equal to or greater than the rate of flow of the used fluid into the drain receptacle.

Bethurum, U.S. Pat. No. 4,120,425, discloses an apparatus for dispensing sparkling wines. Generally, a sparkling wine storage vessel has a flexible diaphragm for pneumatic pressurization without gas coming in contact with the wine.

Sancoff et al., U.S. Pat. No. 5,398,851, discloses a liquid delivery device. Generally, the device is uniquely suited to meet the requirements of hospitals for long shelf life in inert condition and ready activation when needed, and it includes a hollow gas- and liquid-tight casing, which is preferably spherical or cylindrical, a flexible gas- and liquid-tight membrane disposed entirely across the casing interior to divide the interior into a propellant chamber and a liquid chamber; an outlet port from the liquid chamber; two mutually reactive chemicals in the propellant chamber but separated by a barrier; and a member to breach the barrier and permit the chemicals to come into contact, the two chemicals being reactive upon contact to form a propellant gas, for expulsion of the contained liquid in the liquid chamber on the opposite side of the membrane.

Takeuchi, U.S. Pat. No. 4,193,487, discloses a combined new oil vending and waste oil removing apparatus. That apparatus has a waste oil removing device, a fresh oil feeding device, and a control device for controlling the removal and feeding devices. Oils to and from the removing and feeding devices are moved by separate pumps. The device is a coin-operated vending machine.

Watts, U.S. Pat. No. 5,190,120, discloses a flushing apparatus for a vehicle oil pump pickup tube and screen. Generally, in combination with a vehicle engine, a pickup tube in the crankcase at one end is connected to the pump inlet, and at its other end has an intake with a screen near the bottom of the oil pan. A reservoir containing a flushing fluid has an outlet pipe, and a pressurized air source is connected to the outlet pipe. An adapter on the outlet pipe is mounted on a filter mount boss on the oil pump and is connected to its outlet for feeding flushing fluids through the pump and through the pickup tube and its screen in the reverse direction to clean out the intake filter.

Edgar et al., U.S. Pat. No. 3,033,311, discloses an oil removal and gauging apparatus. In brief, it includes the provision of a tube of sufficient diameter to form a sheath or guide tube for the dip stick on an internal combustion engine and to extend this tube inside the crankcase to the bottom thereof. The external upper end of the tube is provided with means for connecting the inlet of a pump for withdrawal of the crankcase oil.

Bedi, U.S. Pat. No. 5,044,334, discloses a process for clean, simple and high-speed oil change and/or flushing of the moving components of the crankcase in an internal combustion engine. The device includes an oil filter adapter adapted to be positioned in the oil filter boss, a remote oil filter mounting boss, and inlet and outlet hoses connecting the two. Spent oil is removed by suction force. Fresh oil is next pumped in.

Fisher, U.S. Pat. No. 5,284,223, discloses an apparatus and method for monitoring oil levels in marine outdrives. It may be known as a vent apparatus, and it may have a gravity flow lubricator.

The following domestic patents were cited in Courcy:

Lynch, U.S. Pat. No. 1,630,899. It discloses a pressure operated grease dispenser.

Bryant, U.S. Pat. No. 3,112,845. It discloses bulk fluid transport.

Thomas, U.S. Pat. No. 3,223,291. It discloses a measured charge dispenser.

Johansson, U.S. Pat. No. 3,370,759. It discloses a fluid dispenser with an alternate discharge floating piston.

Becnel, U.S. Pat. No. 3,513,941. It discloses a fluid change means for automatic transmissions.

Johnston, U.S. Pat. No. 3,565,287. It discloses a beverage dispensing and measuring unit. Dooley et al., U.S. Pat. No. 4,438,872. It discloses dispensing apparatus.

DiMatteo, U.S. Pat. No. 4,745,989. It discloses a valve for draining automatic transmission fluid and a method of using the same.

Art additionally cited herein includes the following:

Hall U.S. Pat. No. 637,250: Automatic Compound Feeder for Steam Boilers.

Mitchell, U.S. Pat. No. 1,493,049: Pressure Lubricator.

Simpson, U.S. Pat. No. 3,236,268: Device for Transferring Liquid.

German Auslegeschrift 1 023 597.

The following U.S. Patents are also noted: Peralta, U.S. Pat. No. 5,372,219; Bedi et al., U.S. Pat. No. 5,263,445; Engelmann, U.S. Pat. No. 5,238,085; and Nelson, U.S. Pat.

No. 4,869,346. In general, these patents disclose devices for changing engine oil, and in such art, pumping and monitoring systems operate to change the oil.

Finally, Burman, U.S. Pat. No. 5,522,474, discloses an apparatus and method for changing automatic transmission fluid. In nature and gist, it describes a system and method for extracting used transmission fluid from an automatic transmission in a motor vehicle utilizing the vehicle engine. A reservoir is provided having a free floating piston therein, dividing the reservoir into two chambers. A first flexible line connects from a first chamber to a transmission fluid outlet of the transmission, and a second flexible line connects from a second chamber to a fluid input of a transmission fluid cooler. The second chamber is initially filled with fresh fluid, forcing the piston toward the first chamber. Operation of the vehicle engine causes the transmission pump to pump used fluid into the first chamber, forcing the piston to expel fresh fluid from the second chamber, and into the cooler and transmission. A sight gauge in the first flexible line permits visual monitoring of the flow of dark, used fluid to determine when all of the fluid in the transmission has been ejected, collected in the first chamber for disposal, and completely replaced with fresh fluid.

THE INVENTION

The invention herein utilizes the volume of liquid in a closed vessel that is to be replaced, to measure the amount of liquid replacing the liquid that is in the closed vessel.

This invention requires that the liquid to be replaced, be pumped by some mechanism, to be described infra, into a container already filled with the replacing fluid, but separated from the incoming replacing liquid by a separator wall which is capable of movement within a flexible or inflexible container. The liquid being pumped into the container forces the liquid already filling the container to flow back into the mechanism.

One of the unique features of this invention is the ability to maintain or refresh the quantity level of the replaced liquid for a longer period of time and thus, protect the mechanism as well as the ability to control and handle the liquids for eventual clean up or disposal, depending on the liquid that is being used, and hence, preventing the disposal of the liquid into the environment in an unacceptable manner.

The instant invention as claimed is new and unobvious and allows one skilled in the art to provide for the precise replacement of liquids before, during, or after the operation of a mechanism, which mechanism requires the liquid for operation.

This device is especially useful in precisely replacing the motor oil of an automobile engine and the like. In general, the invention herein can utilize pressure from the volume of liquid in a closed vessel that is to be replaced to measure the amount of liquid replacing the liquid that is in the closed vessel.

Thus, with specificity, the instant invention, in one of its embodiments, provides a device for the precise replacement of liquid in an operating machine wherein the device comprises in combination, an enclosed housing having an inlet end, an outlet end, and an interior wall and a rigid, freely moving piston contained in the housing. The piston has an outer edge which has essentially a leakproof contact with the interior wall of the housing, an inlet port communicating with the interior of the housing through the inlet end, and an outlet port communicating with the interior of the housing through the outlet end.

Further embodiments contemplated within the scope of the claims include at least one guide rod for guiding the piston in its travel within the housing.

Numerous advantages attend the invention.

BRIEF DESCRIPTION OF THE DRAWINGS

The drawings form part of the specification hereof. Therein, like features have like numerals, and the following is noted.

DETAILED DESCRIPTION

The invention may be further illustrated by the following detail, which may be taken in view of the drawings. The same is intended to be illustrative, and not necessarily limiting, in nature.

Figure 1:
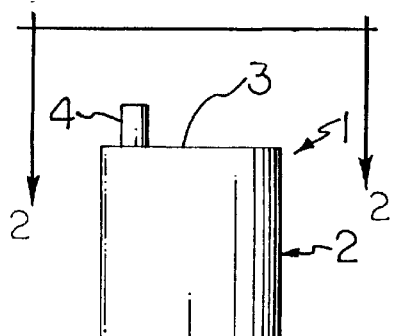
FIG. 1 is a side view of a device of this invention.
Figure 2:
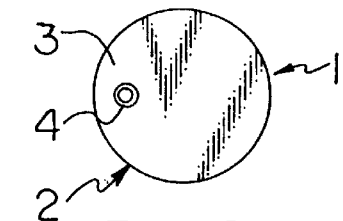
FIG. 2 is an end view of the device of FIG. 1.
Figure 3:
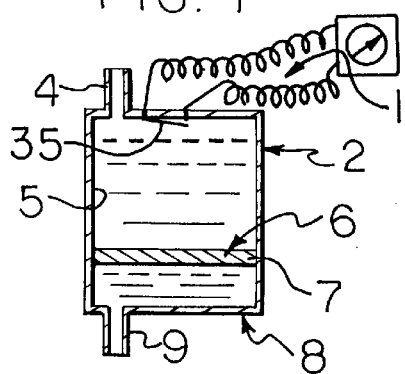
FIG. 3 is a cross-sectional side view of the device of FIG. 1 through the lines 2—2 wherein the device is filled with liquid.

With regard to the drawings and with particular reference to FIGS. 1, 2, and 3, there is shown a plan view of a device 1 of this invention wherein there is shown a closed housing 2 having an outlet end 3 with an outlet port 4 extending therefrom, said port 4 having an open communication between it and the interior of the outlet end 3 of the housing 2. With reference to FIG. 3, it can be observed that the closed housing 2 has an interior wall 5 which will be discussed in detail infra.

There is also shown in FIG. 3, a rigid, freely moving piston 6. The piston 6 may have an outer circular flexible seal 7 which has essentially a leakproof contact with the interior wall 5 of the housing 2. The piston 6 need not, however, be circular in cross-section as from its top as shown in FIG. 2, but may be elliptical, triangular, square, rectangular, trapezoidal, pentagonal, hexagonal, irregular, and so forth, in cross-section from its top, provided the housing 2 corresponds in shape thereto or to piston sealing rings, as well known in the art. Nevertheless, a circular piston 6 is commonly employed.

On one end of the housing 2, opposite the outlet end 3, there is an inlet end 8 with an inlet port 9 extending therefrom. This inlet port 9 has an open communication between it and the interior of the inlet end 8, but not the outlet end 3, of the housing 2.

In practice, liquids are used in the device 1 for precise replacement of liquids in a mechanism before, during, or after operation of a mechanism. Thus, the liquids used in the device can be oils, or oils and oil additives, or just the additives themselves. The device 1, during its manufacture, has the piston 6 retracted tightly down against the inlet wall 8 and volume of the housing 2 that remains, is filled with the desired liquid to be dispensed. Thereafter, the housing 2 is capped at the outlet end 3; the outlet port 4 is temporarily plugged, and the device 1 is ready for use. Since the invention in operation uses the volume of liquid to be replaced to measure the amount of liquid replacing the former, the device is introduced into the system, such an engine oil line, and, during operation of the engine, the liquid being pumped from the engine into the housing forces the liquid already filling the container to flow back to the engine. Thus, there is no gain or loss on the liquid in the engine from this operation. And so, the precise replacement of liquid can be in an entry liquid to exit liquid ratio of 1:1.

A specific example of that described above would be the slow replacement of engine oil during the normal driving interval before oil replacement. In this case, the used oil is metered by diversion from the oil pump to slowly enter the container and displace an equal volume of the fresh oil into the engine. Depending on the volume initially available in the housing 2, only this amount would be forced into the engine as replacement oil by the oil pumped into the container. Another example is the replacement of automatic transmission fluid. Passenger car automatic transmissions allow very little oil to be removed and changed since most of the fluid is unavailable in the torus and elsewhere. On the other hand, particularly with today's design of the automobile and the use of front-wheel drives, it is often desirable to replace the oxidized automatic transmission fluid. By the application of the invention, the connecting lines to the transmission cooler are uncoupled from the cooler, coupled to the appropriate devices of this invention embodying the concepts of the invention, and the used automatic transmission fluid would be essentially replaced by unused fluid.

The particular embodiment of FIGS. 1, 2, and 3 is not the only embodiment that is useful in this invention.

Figure 4:
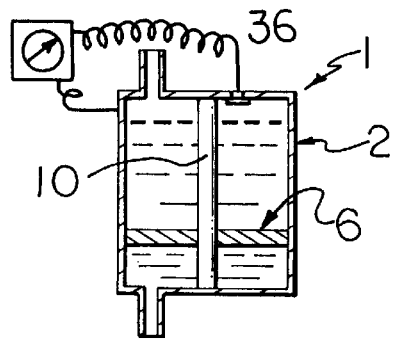
FIG. 4 is a cross-sectional side view of a device similar to that shown in FIG. 1 through lines 2—2, except that this device shows the use of a guide rod.

One embodiment can be observed with reference to FIG. 4, in which there is shown in addition to the features discussed supra, a piston 6, which is guided by a piston guide 10. It should be understood by those skilled in the art that more than one piston guide 10 can be used in this invention, it being a design choice of the end user as to which number of piston guides 10 should be used.

Figure 5:
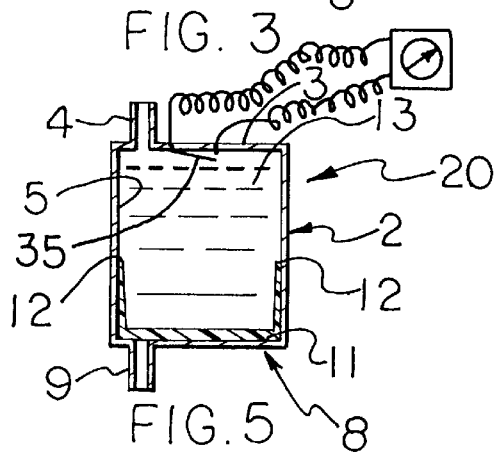
FIG. 5 is a cross-sectional view of the device of FIG. 1 in which the piston has been replaced with a flexible diaphragm.

A further embodiment of this invention can be found illustrated in FIG. 5 wherein there is shown a device 20, having a closed housing 2, having an outlet end 3 with an outlet port 4 extending therefrom, said port 4 having an open communication between it and the interior of the outlet end 3 of the housing 2. With reference to FIG. 5, it can be observed that the closed housing 2 has an interior wall 5. Attached to the interior wall 5 is a flexible diaphragm 11. In this embodiment of the invention, this diaphragm 11 is intended to serve the function of the piston 6 as shown in FIGS. 1, 2, and 3. The attachment of the diaphragm 11 to the interior wall 5 can be in a circumferential line at about the midpoint 12 of the housing 2. This attachment is a fixed attachment in that one does not want the diaphragm to move from its attachment line 12 during the operation of the device 20. Also, the attachment of the diaphragm 11 to the interior wall 5 must consist of a leakproof attachment. Also shown in FIG. 5 is a fluid 13. The FIG. 5 illustration shows the fluid filling the housing 2, and it should be noted that the fluid 13 should fill the entire housing 2 except for the presence of the diaphragm 11, and FIG. 5 shows the diaphragm 11 situated away from the interior wall 5 of the housing 2, but, in practice, this diaphragm 11 would lie in intimate contact with the inside wall 5 of the outlet end 8, and its separation as shown in FIG. 5 is for purposes of making the configuration of the device 20 clear to those skilled in the art. At this point, the device 20 is ready for use.

Figure 6:
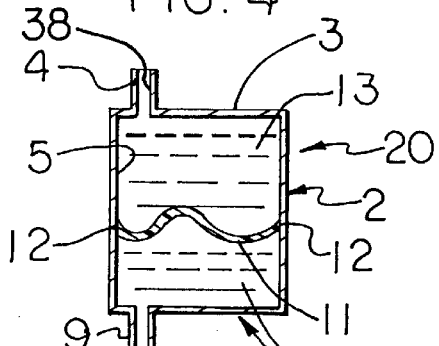
FIG. 6 is a cross-sectional view of a device as of FIG. 1 but in which the piston has been replaced with a flexible diaphragm, and the flexible diaphragm has been displaced to near the center of the device.

Shown in FIG. 6 is the device 20 having a flexible diaphragm 11, in which about one-half of the fluid 13 has been used. It has been replaced on the underside of the diaphragm 11 by used fluid 14. As the fluid 14 moves into the housing 2, via the inlet port 9, the fluid 13 is displaced because the diaphragm 11 acts as a pressure-transmitting barrier as does the piston and moves the fluid 13 out of the outlet port 4 to be reintroduced into the mechanism that is losing fluid 14 to this device 20. Thus, the precise replacement of liquid can be in an entry liquid to exit liquid ratio of 1:1.

Figure 7:
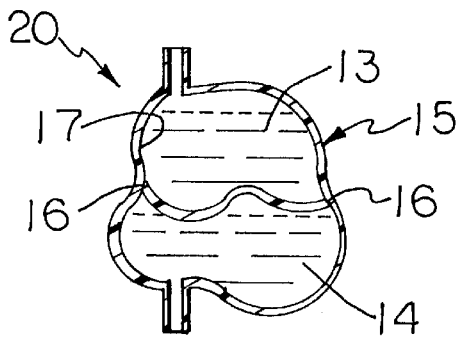
FIG. 7 is a cross-sectional view of a simple flexible bag and flexible diaphragm in combination to provide another embodiment of a device of this invention.

Yet another embodiment of this invention is that shown in FIG. 7 wherein the housing 15 is flexible as opposed to the rigid housing 2 of the first embodiment of the invention discussed supra. It should be noted that the flexible housing 15 has a flexible diaphragm 11 attached to about the midpoint 16 of the flexible housing 15, on the interior wall 17.

Figure 8:
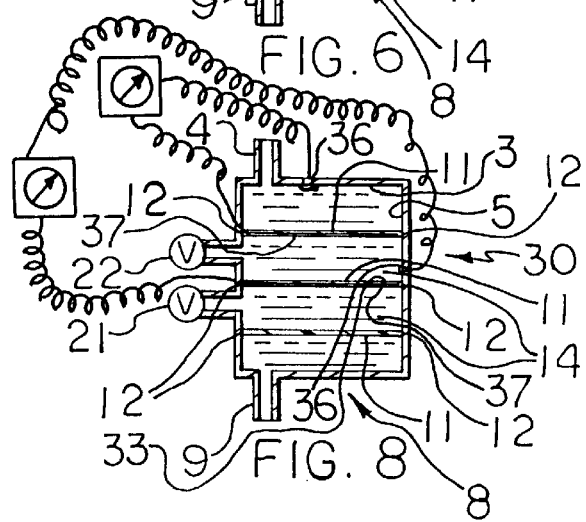
FIG. 8 is a cross-sectional view of the device as of FIG. 1 but wherein there are present several diaphragms and a valve arrangement.

Turning to the device as shown in FIG. 8, it can be observed that yet another embodiment of this invention is one in which there are multiple cells within the housing 2, in combination with a valve system, whereby several additives can be displaced at the same time. Thus, shown in FIG. 8 is the device 30, having several cells or chambers, an outlet port 4, flexible diaphragms 11, the inside wall 5 of the housing 2 wherein the diaphragms 11 are attached at points 12, the valves 21 and 22, and the various liquids to be delivered.

Figure 9:
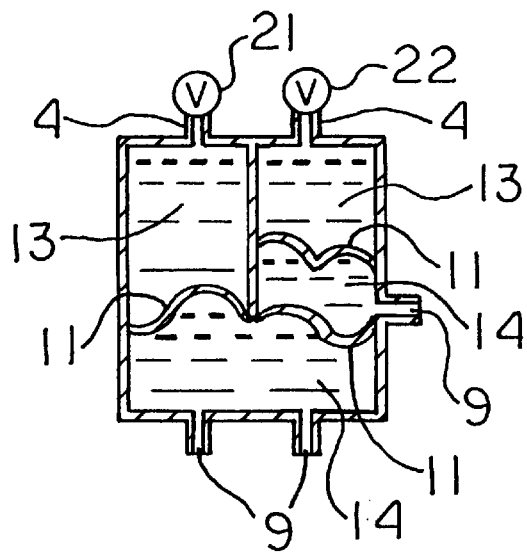
FIG. 9 is a cross-sectional view of another embodiment hereof, with parallel diaphragms and discharge chambers.

In FIG. 9 is seen a view from the side of another embodiment of the instant invention. This embodiment includes fluids 13 to be discharged through outlet ports 4 in parallel discharge chambers. Each discharge chamber has a diaphragm 11 associated therewith.

Figure 10:
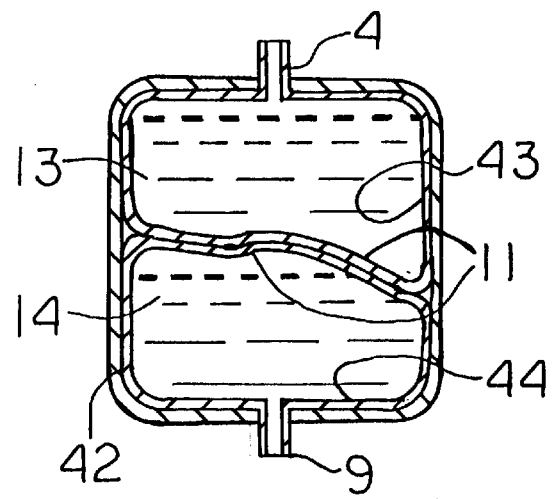
FIG. 10 is a cross-sectional view of another embodiment hereof, having discharge and collection bags to form a diaphragm.

In FIG. 10 is seen, in a view from the side, another embodiment hereof. In this embodiment, the diaphragm 11 is formed by areas of fresh discharge bag 43 and used collection bag 44 which lie in side-by-side contact to effect the diaphragm 11. The bags are flexible. The housing can be rigid, or as illustrated in this figure, flexible but not expansible such as may be provided by a mesh polypropylene and/or metal strand bag 42.

Figure 11:
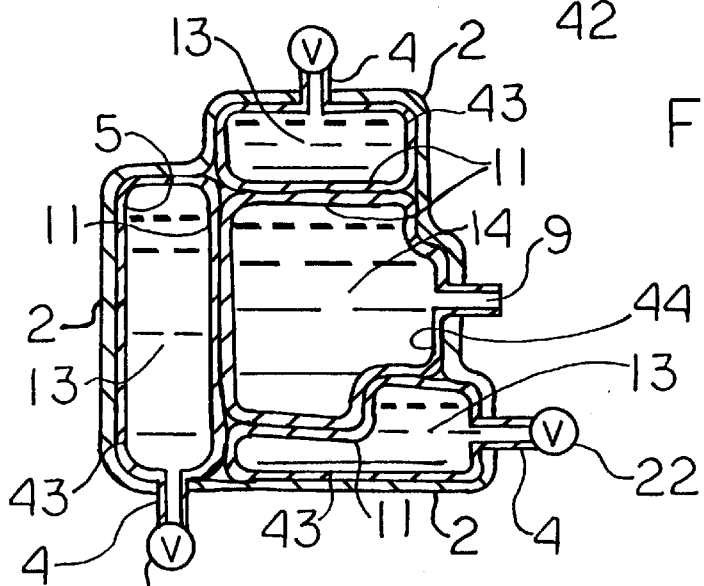
FIG. 11 is a cross-sectional view of another embodiment hereof, having a plurality of discharge bags.

In FIG. 11 is seen, in a view from the side, another embodiment hereof. This illustrative embodiment, in an extension of the disclosures provided by FIGS. 8 and 10, has a plurality of flexible discharge bags 43 activated by collection of used fluid in the flexible bag 44 so as to discharge a plurality of fresh fluids out ports 4. Inlet and outlet portions, especially the inlet portion 44 which may be more centrally located, need not be at the "ends" of the housing.

With the bag embodiments, the bags 43/44 may contact directly or indirectly to provide the diaphragm. The direct contact is by bag boundary to bag boundary touching. The indirect contact may be through an intermediary such as another membrane or web, or a rigid solid, interposed between the bags. Further, in the case of an enclosed, generally imperforate housing, saving of course designed entry and exit ports, etc., a neutral liquid or generally noncompressible fluid may be provided within the housing 2 but outside the boundaries of the bags 43/44. Thus, when fluid is collected in a bag, it immediately applies discharge pressure to the remaining bag(s) in the housing, which, if left to communicate to the exterior through exit or outlet port(s) 4 as when valve(s) 21/22, etc., are opened, expel their contents through open exit or outlet port(s) 4.

More than one inlet port 9 may be present. See, FIG. 9.

It should be noted by those skilled in the art that the devices of this invention can be used in combination with metering devices, filters, various signal devices such as an exhaustion device, and other equipment.

The metering device can be as simple as gravity flow, wherein the diameter of the interior of a tube can be the metering device and control the amount of flow from the device. The other devices that are used in combination with the devices of this invention may either be in the fluid transmission lines, can be installed either in from of the inventive device or behind the inventive device, as long as the minimum requirements are met in order to utilize the device of this invention. It is contemplated to be within the scope of this invention to incorporate one or more of these combinable devices into the housing of the inventive device. For example, a filter could be installed in the inventive device at the outlet end of the housing, or a filter could be installed at the inlet end of the inventive device for filtering the used liquid as it makes its way into the device. In this case, a by-pass device would permit the used oil to be circulated through the engine and oil filter even as small amounts of the used oil are metered into the oil replacement device of this invention. To further illumine such other devices, the exhaustion device or signal, for example, may be provided by simple action of a piston 6 brought into contact with an electrical switch 35 at the end 3 of its stroke so as to close the switch and trigger the signal as is known in the art and as seen in FIG. 3; in the case of a diaphragm 11, it may press the electrical switch 35 and trigger the signal as well as seen in FIG. 5; alternatively the piston 6 itself may touch a contact point 36 at the end 3 of its stroke to close an electrical circuit therewith and cause the signal as seen in FIG. 4, and likewise, with diaphragm(s) 11, particularly one(s) having embedded wires 37 exposed for contact with such a contact point 36 or area, may touch the contact point 36 or area at the end of its(their) travel 3(33) or at a point or points 37 along the way to the end of its(their) travel so as to close the electrical circuit(s) and trigger the signal(s) as can be seen in FIG. 8. In addition, as contemplated and alluded to generally above, which any person skilled in the art would recognize, the simple expedient of there being no more fluid to discharge from an outlet port 4 would cause a drop in pressure thereat, which can be readily measured by devices such as a pressure-monitoring device 38 well known in the art and as can be seen in FIG. 6.

There are a number of benefits which accrue from the devices of this invention, such as maintenance of higher levels of the active additives in the liquids being used as a consequence of gradual replacement; replacement of liquids which are spent without shutdown of the mechanism; gathering of used liquids for appropriate disposal by permitting relatively easy replacement of the container containing the used liquid without onerous effort or contact with skin-hazardous liquids. The filters that are used in combination with the devices of this invention can also be recycled or disposed of properly.

Numerous further advantages attend the invention.

CONCLUSION

The present invention is thus provided. Numerous adaptations and modifications can be effected within its spirit, the literal claim scope of which is particularly pointed out as follows:

I claim:

1. A device for precise replacement of liquid in an operating machine, said device comprising:

an enclosed housing having an inlet portion, an outlet portion, an interior, and at least one interior wall;

at least one flexible diaphragm contained in the housing, the at least one flexible diaphragm having an outside edge attached to the at least one interior wall in a location on the at least one interior wall which provides for a plurality of cavities within the housing;

the at least one flexible diaphragm being sized such that at least one of the at least one flexible diaphragm can be compressed fully against a wall of the inlet portion of the housing without detaching from the at least one interior wall;

at least one inlet port communicating with the interior of the housing through the inlet portion; and at least one outlet port communicating with the interior of the housing through the outlet portion;

wherein the device is adapted for and made so that, when it is working to replace the liquid in the operating machine, used liquid from the operating machine enters the inlet portion through the at least one inlet port communicating with the interior of the housing through the inlet portion, and fresh liquid for the operating machine exits the outlet portion through the at least one outlet port communicating with the interior of the housing through the outlet portion—such that the precise replacement of liquid in the operating machine is controlled by liquid pressure from the used liquid from the operating machine on the at least one flexible diaphragm; and when the device is working to replace the liquid, the liquid is replaced during normal operation of the machine.

2. The device of claim 1, in which the enclosed housing is rigid.

3. The device of claim 1, in which the enclosed housing is flexible.

4. The device of claim 1, further comprising a metering device for the liquid, said metering device controlling the amount of flow of the liquid in a flow direction selected from the group consisting of into the device and out of the device.

5. The device of claim 1, further comprising an exhaustion signal to signal when the device has exhausted its supply of liquid in the outlet portion.

6. The device of claim 1, wherein as the at least one diaphragm a plurality of diaphragms are present.

7. The device of claim 1, wherein the precise replacement of liquid is carried out during the working of the device to replace the liquid in the machine in an entry liquid to exit ratio of 1:1.

8. The device of claim 1, wherein the operating machine is an internal combustion engine in a motor vehicle; the liquid is motor oil, and, when the device is working to replace the oil of the engine, the oil is replaced during normal operation of the engine during driving of the vehicle.

9. The device of claim 1, the operating machine is an internal combustion engine in a motor vehicle; the liquid is a motor oil additive, and, when the device is working to replace the additive of the oil of the engine, the additive is replaced during normal operation of the engine during driving of the vehicle.

10. The device of claim 1, wherein the operating machine is an automatic transmission of a motor vehicle; the liquid is automatic transmission fluid, and, when the device is working to replace the fluid of the transmission, the fluid is replaced during normal operation of the transmission during driving of the vehicle.

11. A device for precise replacement of a liquid in an operating machine, said device comprising:

an enclosed housing having an inlet portion, an outlet portion, an interior, and an interior wall;

a rigid, freely moving piston contained in the housing, the piston having an outer edge which has essentially a leakproof contact with the interior of the housing;

at least one inlet port communicating with the interior of the housing through the inlet portion; and at least one outlet port communicating with the interior of the housing through the outlet portion;

wherein:

if the piston is guided by at least one piston rod, the at least one piston rod is immovably fixed and positioned in the interior of the housing only;

the device is adapted for and made so that, when it is working to replace the liquid in the operating machine, used liquid from the operating machine enters the inlet portion through the at least one inlet port comunicating with the interior of the housing through the inlet portion, and fresh liquid for the operating machine exits the outlet portion through the at least one outlet port communicating with the interior of the housing through the outlet portion — such that the precise replacement of liquid in the operating machine is controlled by liquid pressure from the used liquid from the operating machine on the piston; and when the device is working to replace the liquid, the liquid is replaced during normal operation of the machine.

12. The device of claim 11, wherein the operating machine is an internal combustion engine in a motor vehicle; the liquid is motor oil, and, when the device is working to replace the oil of the engine, the oil is replaced during normal operation of the engine during driving of the vehicle.

13. The device of claim 11, wherein the operating machine is an internal combustion engine in a motor vehicle, the liquid is a motor oil additive, and, when the device is working to replace the additive of the oil of the engine, the additive is replaced during normal operation of the engine during driving of the vehicle.

14. The device of claim 11, wherein the operating machine is an automatic transmission of a motor vehicle; the liquid is automatic transmission fluid, and, when the device is working to replace the fluid of the transmission, the fluid is replaced during normal operation of the transmission during driving of the vehicle.

15. The device of claim 11, further comprising a metering device for the liquid, said metering device controlling the amount of flow of the liquid in a flow direction selected from the group consisting of into the device and out of the device.

16. The device of claim 11, further comprising an exhaustion signal to signal when the device has exhausted its supply of liquid in the outlet portion.

17. A method for precise replacement of a liquid in an operating machine, said method comprising:

providing a device for precise replacement of liquid in an operating machine, said device including: an enclosed housing having an inlet end, an outlet end, and at least one interior wall; a pressure-transmitting barrier selected from the group consisting of:

flexible diaphragm having an outside edge attached to the at least one interior wall in a location on the at least one interior wall which provides for a plurality of cavities within the housing, and a rigid, freely moving piston contained in the housing, wherein the piston has an outer edge which has essentially a leakproof contact with the at least one interior wall of the housing, and wherein, if the piston is guided by at least one piston rod, the at least one piston rod is immovably fixed and positioned in the interior of the housing only;

at least one inlet port communicating with the interior of the housing through the inlet end; and at least one outlet port communicating with the interior of the housing through the outlet end; wherein used liquid from the operating machine can enter the inlet portion through the at least one inlet port communicating with the interior of the housing through the inlet end, and fresh liquid for the operating machine can exit the outlet portion through the at least one outlet port communicating with the interior of the housing through the outlet end —such that the precise replacement of liquid in the operating machine can be controlled by liquid pressure from the used liquid from the operating machine on the pressure-transmitting barrier;

providing the operating machine, which includes a generally closed vessel in which the operating machine liquid is contained;

suitably connecting said device to be in communication with the operating machine; and operating the operating machine in normal operating uses under conditions such that the used liquid from the operating machine enters the inlet portion through the at least one inlet port communicating with the interior of the housing through the inlet end, and the fresh liquid for the operating machine exits the outlet portion through the at least one outlet port communicating with the interior of the housing through the outlet end, and the precise replacement of the liquid in the operating machine is controlled by liquid pressure from the used liquid from the operating machine on the at least one pressure-transmitting barrier while the operating machine is in normal operating use.

18. The method of claim 17, wherein the pressure-transmitting barrier is the diaphragm.

19. The method of claim 18, wherein the operating machine is an internal combustion engine in a motor vehicle, the liquid is a motor oil additive, and, when the device is working to replace the additive of the oil of the engine, the additive is replaced during normal operation of the engine during driving of the vehicle.

20. The method of claim 18, wherein the operating machine is an automatic transmission of a motor vehicle, and the liquid is the automatic transmission fluid.

21. The method of claim 18, wherein the operating machine is an internal combustion engine in a motor vehicle; the liquid is motor oil, and, when the device is working to replace the oil of the engine, the oil is replaced during normal operation of the engine during driving of the vehicle.

22. The method of claim 17, wherein the pressure-transmitting barrier is the piston.

23. The method of claim 20, wherein the operating machine is an internal combustion engine in a motor vehicle;

the liquid is motor oil, and, when the device is working to replace the oil of the engine, the oil is replaced during normal operation of the engine during driving of the vehicle.

24. The method of claim 22, wherein the operating machine is an internal combustion engine in a motor vehicle, the liquid is a motor oil additive, and, when the device is working to replace the additive of the oil of the engine, the additive is replaced during normal operation of the engine during driving of the vehicle.

25. The method of claim 22, wherein the operating machine is an automatic transmission of a motor vehicle, and the liquid is the automatic transmission fluid.

* * * * *